United States Patent
Sepeur et al.

(10) Patent No.: US 9,249,480 B2
(45) Date of Patent: Feb. 2, 2016

(54) METHOD FOR PRODUCING ALKALI AND ALKALINE EARTH ALLOYS AND USE OF THE ALKALI AND ALKALINE EARTH ALLOYS

(75) Inventors: Stefan Sepeur, Wadgassen (DE); Gerald Frenzer, Saarbruecken (DE); Stefan Huefner, Saarbruecken (DE); Frank Mueller, Saarbruecken (DE)

(73) Assignees: NANO-X GmbH, Saarbruecken (DE); ElringKlinger AG, Dettingen an der Erms (DE), part interest ( * ) Notice: Subject to any disclaimer, the term of this patent is extended or adjusted under 35 U.S.C. 154(b) by 81 days.

(21) Appl. No.: 13/138,373

(22) PCT Filed: Feb. 9, 2010

(86) PCT No.: PCT/DE2010/075013
§ 371 (c)(1),
(2), (4) Date: Sep. 13, 2011

(87) PCT Pub. No.: WO2010/088902
PCT Pub. Date: Aug. 12, 2010

(65) Prior Publication Data
US 2012/0156379 A1    Jun. 21, 2012

(30) Foreign Application Priority Data

Feb. 9, 2009   (DE) .................. 10 2009 008 144

(51) Int. Cl.
*B05D 3/02*      (2006.01)
*C22C 1/00*      (2006.01)
(Continued)

(52) U.S. Cl.
CPC ............... *C22C 1/00* (2013.01); *B01J 21/063* (2013.01); *B01J 23/02* (2013.01); *B01J 23/04* (2013.01);
(Continued)

(58) Field of Classification Search
CPC ................................. C22C 24/00; B01J 23/04
USPC ............................................... 427/376.1
See application file for complete search history.

(56) References Cited

U.S. PATENT DOCUMENTS 2,171,439 A     8/1939   von Zeppelin
3,469,729 A *   9/1969   Grekila et al. ............ 220/2.3 R
(Continued)

FOREIGN PATENT DOCUMENTS

CH   216 205   8/1941
CH   219 713   2/1942
(Continued)

OTHER PUBLICATIONS

International Search Report of PCT/DE2010/075013, Aug. 11, 2010.
(Continued)

*Primary Examiner* — Nathan Empie
(74) *Attorney, Agent, or Firm* — Collard & Roe, P.C.

(57) ABSTRACT

A method for producing alkali and alkaline earth alloys. It also relates to the use of the alkali and alkaline earth compositions. In order to create a novel method for producing alkali and alkaline earth alloys, it is proposed within the context of the invention that salts, hydroxides, alkoxides or oxides of alkali or alkaline earth compounds be mixed with salts, hydroxides, alkoxides or oxides of semi-metals, nonmetals or metals and then heated to at least 100° C., the salts, hydroxides, alkoxides or oxides of alkali or alkaline earth metals being present in a molar ratio of 1:1 or in excess thereof in relation to the salts, hydroxide, alkoxides or oxides of the semi-metals, nonmetals or metal. Surprisingly, it was found within the context of the invention that by mixing salts, hydroxides, alkoxides or oxides of alkali or alkaline earth compounds with salts, hydroxides, alkoxides or oxides of semi-metals or metals from the 3rd or 4th main group and subsequent heating, alkali or alkaline earth alloys can be produced.

9 Claims, 1 Drawing Sheet

(51) Int. Cl.
 B01J 21/06 (2006.01)
 B01J 23/02 (2006.01)
 B01J 23/04 (2006.01)
 B01J 35/00 (2006.01)
 B01J 37/02 (2006.01)
 C22C 24/00 (2006.01)

(52) U.S. Cl.
 CPC ............ *B01J 35/002* (2013.01); *B01J 37/0215* (2013.01); *C22C 24/00* (2013.01); *B01D 2255/202* (2013.01); *B01D 2255/204* (2013.01); *B01D 2255/2027* (2013.01); *B01D 2255/2045* (2013.01); *B01D 2255/2092* (2013.01); *B01D 2255/30* (2013.01); *B01D 2258/012* (2013.01)

(56) References Cited

U.S. PATENT DOCUMENTS

| | | | | |
|---|---|---|---|---|
| 3,996,335 | A | * | 12/1976 | Wolk ............... B01D 53/52 423/210.5 |
| 4,939,310 | A | * | 7/1990 | Wade ............................ 585/500 |
| 5,011,548 | A | * | 4/1991 | Dean ............................ 148/27 |
| 5,068,483 | A | | 11/1991 | Barthomeuf et al. |
| 5,478,672 | A | * | 12/1995 | Mitate ............................ 429/224 |
| 5,739,076 | A | * | 4/1998 | Huybrechts et al. ....... 562/512.4 |
| 6,245,306 | B1 | * | 6/2001 | Miyazaki ............. B01D 53/945 423/213.5 |
| 7,247,350 | B2 | | 7/2007 | Sepeur et al. |
| 2003/0103886 | A1 | * | 6/2003 | Dou ................... B01D 53/8628 423/239.1 |
| 2005/0151278 | A1 | | 7/2005 | Lefenfeld et al. |
| 2009/0238986 | A1 | | 9/2009 | Gross et al. |
| 2010/0081569 | A1 | | 4/2010 | Sepeur et al. |

FOREIGN PATENT DOCUMENTS

| | | |
|---|---|---|
| DE | 10 2005 021 658 | 1/2006 |
| DE | 10 2005 027 789 | 12/2006 |
| DE | 10 2007 016 946 | 10/2008 |
| WO | WO 89/04716 | 6/1989 |
| WO | WO 02/50191 | 6/2002 |
| WO | WO 2006/036697 | 4/2006 |
| WO | WO 2007/095276 | 8/2007 |
| WO | WO 2008/031101 | 3/2008 |
| WO | WO 2008/122266 | 10/2008 |
| WO | WO 2008/131270 | 10/2008 |

OTHER PUBLICATIONS

English translation of the International Preliminary Report on Patentability for PCT/DE2010/075013, Aug. 11, 2011.

Vorlow, S. et al., "The catalytic activity and selectivity of supported vanadia catalysts doped with alkali metal sulphates. I. Structural re-organisations during pre-treatment and use," Applied Catalysis, 17(1), pp. 87-101, CODEN: APCADI; ISSN: 0166-9834, 1985, XP002592568. (ISR) (Spec, p. 1—see Preliminary Amendment).

Vorlow, S. et al., "The catalytic activity and selectivity of supported vanadia catalysts doped with alkali metal sulphates. III. The effect of variation in the chemical nature of the alkali metal," Applied Catalysis, 17(1), pp. 115-125, (1985).

Reddy et al., "Influence of alkaline earth metal on acid-base characteristics of $V_2O_5$/Mo—$TiO_2$ (M=Ca, Sr and Ba) catalysts," Journal of Molecular Catalysis. A, Chemical, Elsevier, Amsterdam, NL, LNKD-DOI:10.1016/J.MOLCATA.2007.07.018, vol. 276, No. 1-2, Sep. 14, 2007, pp. 197-204, XP022248081, ISSN: 1381-1169. (ISR) (Spec, p. 1—see Preliminary Amendment).

Zhao et al., "Effect of alkaline earth metals on catalytic performance of HY zeolite for alkylation of α-methylnaphthalene with long-chain olefins," Microporous and Mesoporous Materials, Elsevier Science Publishing, New York, US, LNKD-DOI:10.1016/J.MICROMESO. 2006.03.028, vol. 94, No. 1-3, Sep. 8, 2006, pp. 105-112, XP005601295, ISSN: 1387-1811. (ISR).

\* cited by examiner

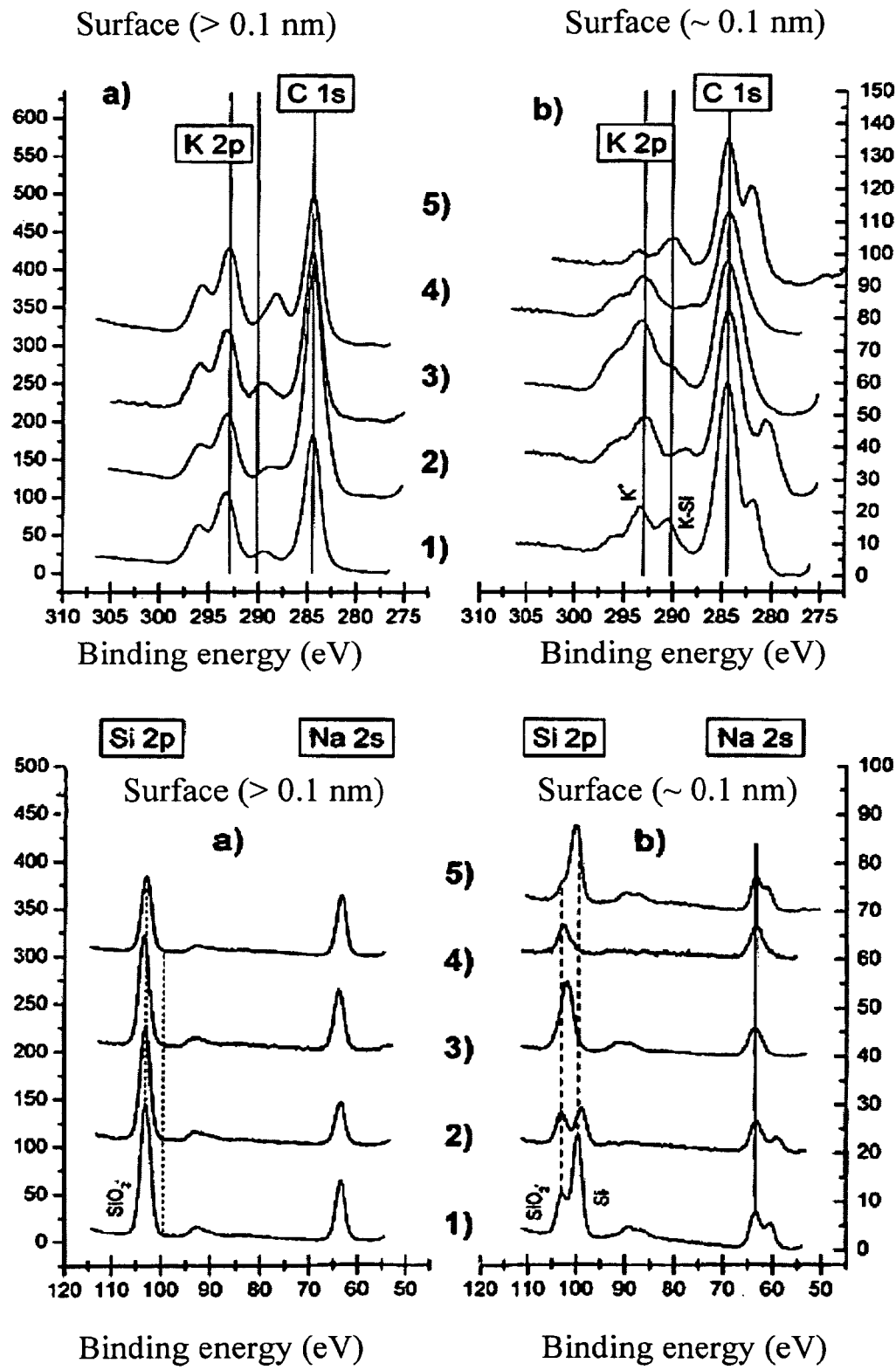
Photoelectron spectroscopy for a catalytically active coating.

METHOD FOR PRODUCING ALKALI AND ALKALINE EARTH ALLOYS AND USE OF THE ALKALI AND ALKALINE EARTH ALLOYS

CROSS REFERENCE TO RELATED APPLICATIONS

This application is the National Stage of PCT/DE2010/075013 filed on Feb. 9, 2010, which claims priority under 35 U.S.C. §119 of German Application No. 10 2009 008 144.5 filed on Feb. 9, 2009, the disclosure of which is incorporated by reference. The international application under PCT article 21(2) was not published in English.

The invention relates to a method for producing alkali and alkaline earth alloys. It also relates to the use of the alkali and alkaline earth compositions.

WO 2007/095276 A1 describes a method of removing protective alkyl- or arylsulfonyl groups from a primary or secondary amine, wherein an alkyl- or arylsulfonamide is preferably contacted with Na, $K_2Na$ or $KNa_2$ in the presence of a proton source and under conditions that suffice for the formation of the corresponding amine.

WO 2008/031101 A2 relates to lithium metal-porous oxide compositions (also termed "Group I metal/porous oxide compositions") prepared by mixing liquid lithium metal with a porous metal oxide in an inert atmosphere under sufficiently exothermic conditions to enable the liquid lithium metal to be absorbed into the pores of the porous metal oxide. These compositions are used in organic reactions such as the 0 synthesis.

Silica gel compositions containing alkali metals or alkali metal alloys are described in US 2005/0151278 A1. These compositions are used to neutralize odours.

WO 2006/036697 A2 describes compositions comprising porous metal oxide in the form of titanium oxide or aluminium oxide and an alkali metal or an alkaline earth metal.

WO 2008/131270 A1 describes a method for generating alkali metal phosphides through reduction of tri-substituted phosphines with compositions in which an alkali metal or an alkali metal alloy is absorbed into porous oxide.

The object of this invention is to provide a new method of preparing alkali and alkaline earth alloys.

This object is established according to the invention in that
salts, hydroxides, alkoxides or oxides of alkali or alkaline earth compounds, selected from the group comprising alkali and/or alkaline earth sulphates, chlorides, nitrates, carbonates, formiates, oxalates, sulphides, sulphites, bromides, iodides, fluorides, nitrides, nitrites, phosphates, phosphides, phosphites and acetates
are mixed with
salts, hydroxides, alkoxides or oxides of semi-metals, non-metals or metals, selected from the group comprising $CO_2$, $CO$, $N_2O_3$, $N_2O_5$, $NO_2$, $NO_x$, silicon oxide, aluminium oxide, tellurium oxide, germanium oxide, antimony oxide, gallium oxide, vanadium oxide, manganese oxide, chromium oxide, titanium oxide, zirconium oxide, cerium oxide, lanthanum oxide, cobalt oxide, copper oxide, iron oxide, silver oxide, tungsten oxide and zinc oxide
and subsequently heated to at least 400° C., the salts, hydroxides, alkoxides or oxides of the alkali or alkaline earth metals being present in a molar ratio of 1:1 or in excess thereof in relation to the salts, hydroxides, alkoxides or oxides of the semi-metals, non-metals or metals.

Surprisingly, it was found within the context of the invention that alkali or alkaline earth alloys can be produced by mixing salts, hydroxides, alkoxides or oxides of alkali or alkaline earth compounds with salts, hydroxides, alkoxides or oxides of semi-metals, non-metals or metals and subsequent heating.

The salts, hydroxides or alkoxides of alkali and alkaline earth compounds are preferably selected from the group consisting of lithium nitrate, lithium formiate, lithium carbonate, lithium oxalate, lithium oxide, lithium hydroxide, lithium alkoxide, lithium fluoride, lithium chloride, lithium bromide, lithium iodide, lithium sulphate, lithium sulphite, lithium sulphonate, lithium nitrite, lithium phosphite, lithium phosphate, lithium acetate, sodium nitrate, sodium formiate, sodium carbonate, sodium oxalate, sodium oxide, sodium hydroxide, sodium alkoxide, sodium fluoride, sodium chloride, sodium bromide, sodium iodide, sodium sulphate, sodium sulphite, sodium sulphonate, sodium nitrite, sodium phosphite, sodium phosphate, sodium acetate, potassium nitrate, potassium formiate, potassium carbonate; potassium oxalate, potassium oxide, potassium hydroxide, potassium alkoxid, potassium fluoride, potassium chloride, potassium bromide, potassium iodide, potassium sulphate, potassium sulphite, potassium sulphonate, potassium nitrite, potassium phosphite, potassium phosphate, potassium acetate, rubidium nitrate, rubidium formiate, rubidium carbonate, rubidium oxalate, rubidium oxide, rubidium hydroxide, rubidium alkoxide, rubidium fluoride, rubidium chloride, rubidium bromide, rubidium iodide, rubidium sulphate, rubidium sulphite, rubidium sulphonate, rubidium nitrite, rubidium phosphite, rubidium phosphate, rubidium acetate, caesium nitrate, caesium formiate, caesium carbonate, caesium oxalate, caesium oxide, caesium hydroxide, caesium alkoxide, caesium fluoride, caesium chloride, caesium bromide, caesium iodide, caesium sulphate, caesium sulphite, caesium sulphonate, caesium nitrite, caesium phosphite, caesium phosphate, caesium acetate, magnesium nitrate, magnesium formiate, magnesium carbonate, magnesium oxalate, magnesium oxide, magnesium hydroxide, magnesium alkoxide, magnesium fluoride, magnesium chloride, magnesium bromide, magnesium iodide, magnesium sulphate, magnesium sulphite, magnesium sulphonate, magnesium nitrite, magnesium phosphite, magnesium phosphate, magnesium acetate, calcium nitrate, calcium formiate, calcium carbonate, calcium oxalate, calcium oxide, calcium hydroxide, calcium alkoxide, calcium fluoride, calcium chloride, calcium bromide, calcium iodide, calcium sulphate, calcium sulphite, calcium sulphonate, calcium nitrite, calcium phosphite, calcium phosphate, calcium acetate, strontium nitrate, strontium formiate, strontium carbonate, strontium oxalate, strontium oxide, strontium hydroxide, strontium alkoxide, strontium fluoride, strontium chloride, strontium bromide, strontium iodide, strontium sulphate, strontium sulphite, strontium sulphonate, strontium nitrite, strontium phosphite, strontium phosphate, strontium acetate, barium nitrate, barium formiate, barium carbonate, barium oxalate, barium oxide, barium hydroxide, barium alkoxide, barium fluoride, barium chloride, barium bromide, barium iodide, barium sulphate, barium sulphite, barium sulphonate, barium nitrite, barium phosphite, barium phosphate and barium acetate.

It is within the scope of the invention that the salts, hydroxides, alkoxides or oxides of alkali or alkaline earth compounds are mixed with the oxides of semi-metals, non-metals or metals in the fused state, in the gas phase under elevated pressure or as liquid coating material in a solvent, preferably in water.

The starting materials used to prepare alkali or alkaline earth alloys (salts, hydroxides, alkoxides or oxides of alkali or alkaline earth compounds and oxides of semi-metals, nonmetals or metals) may be diluted with a solvent, in particular water, to a solids content of between 0.05 wt. % and 60 wt. %, preferably between 2 and 20 wt. %, so that a liquid coating material is obtained.

The starting materials used to prepare alkali and alkaline earth alloys may be applied as coating material, in diluted or non-diluted state, to a substrate, after which drying ensues. In this connection, it is expedient that the coating material for preparing alkali and alkaline earth alloys is applied to the substrate by means of a wet-chemical process, in particular by spraying, film casting, flooding, dip coating, wipe-on coating, spin coating, roll coating or printing. It is to advantage here that the coating material used to prepare alkali and alkaline earth alloys is applied such as to give a coating thickness of 10 nm to 100 µm, in particular of 0.5 to 20 µm.

It is also possible for the starting materials used to prepare alkali or alkaline earth alloys to be contained as additives in other coating materials, in particular ceramic slurries, nano-suspensions, glass frits, polymers or sol-gel systems.

It is also within the scope of the invention that at least one of the salts of alkali or alkaline earth metals and/or of semi-metals, non-metals or metals is present as an oxide, it being particularly preferable for the semi-metals, non-metals or metals to be present as oxides.

The invention furthermore provides for heating to be effected up to the melting temperature of the component with the highest melting point. A preferred embodiment of the invention consists in that heating is effected up to 1,000° C., in particular between 100° C.-600° C., for one second up to several hours, in particular for at least one minute, preferably for at least one hour and most preferably for at least 24 hours.

According to the invention, heating takes place in an oxygen-deficient atmosphere, preferably in an oxygen-free atmosphere. Provision may be made here for heating to take place in a forced-air oven or by way of IR radiation.

It is within the scope of the invention that the alkali or alkaline earth alloys are prepared according to the sol-gel process or by way of precipitation reactions, directly from the elements by melting, in particular solid-state reactions, by flame pyrolysis or gas-phase separation, in particular CVD or PVD, by spray-drying or freeze-drying.

In a first embodiment, the alkali and alkaline earth alloys prepared according to the method of the invention are used to produce an abrasion-resistant coating, the coating material used to prepare alkali and alkaline earth alloys being applied section-wise to a substrate or to the entire substrate by means of a wet-chemical process involving spraying, film casting, flooding, dip coating, wipe-on coating, spin coating, roll coating or printing and then heated.

The catalytic activity of the coating is not impaired even in the case of visible abrasive damage (scratches). The catalytic activity particularly promotes the combustion of organic substances and soot, in particular candle soot, diesel soot, model soot and volatile combustion products of wood, natural gas, petroleum and petrol.

In another embodiment, the salts of alkali and alkaline earth alloys are applied to a solid ceramic body consisting of salts of metals, semi-metals or non-metals, subsequent heat treatment at temperatures of over 200° C. causing diffusion processes to take place during which the alkali or alkaline earth alloys diffuse into the ceramic moulding and surface gradients form, the salts, hydroxides, alkoxides or oxides of alkali or alkaline earth metals being present in a molar ratio of 1:1 or in excess thereof in relation to the salts, hydroxides, alkoxides or oxides of the semi-metals, non-metals or metals.

A further variant of the invention consists in that the substrate is a highly porous ceramic substrate onto which a first coating having a higher thermal conductivity than that of the substrate is applied. It is expedient hier for the substrate to have a thermal conductivity of less than 10 $\mu m^{-1}K^{-1}$. With this variant of the invention, it is to advantage that the first coating applied to the substrate has a thermal conductivity of at least 10 $\mu m^{-1}K^{-1}$, preferably of at least 30 $\mu m^{-1}K^{-1}$ and most preferably of at least 50 $Wm^{-1}K^{-1}$.

Provision may also be made for application onto a highly porous ceramic substrate of a catalytically active coating whose thermal conductivity is greater than that of the carrier.

It is also within the scope of the invention that the first coating applied to the substrate consists of metallic materials, in particular silver, copper, gold, aluminium, zinc, tungsten, nickel, iron, platinum, tantalum, lead or titanium, of ceramic materials with a high thermal conductivity, in particular silicon carbide, carbon nanotubes, aluminium oxide, aluminium oxide/zirconium oxide (ZTA), silicon nitride, aluminium nitride, sialon, magnesium oxide, beryllium oxide or boron nitride, of glass-like materials filled with thermally conductive particles, or of combinations of these materials.

According to the invention, the substrate is glass, metal, semi-metal, metal oxide, synthetic stone, natural stone, concrete, plaster, ceramic, enamel, glass ceramic, plastic or a coated surface.

When the substrate is highly porous ceramic filter material, the subject of the invention can be used as a catalyst in engines, in particular the engines of motor vehicles, construction machinery, aeroplanes. locomotives and ships.

When the substrate is glass, the subject of the invention can be used as a self-cleaning coating on the glass doors of fireplaces, see-though oven doors, industrial viewing glasses for combustion processes in household ovens, power plants, coking plants and steelmaking, and as anti-stick agents on glass ceramic, preferably ceramic hobs.

The scope of the invention includes the use of the alkali or alkaline earth alloys prepared according to the method of the invention in the form of particles, in particular as additives in liquids or solutions, in fuels or in solid matter for the purpose of catalysis.

The invention also provides for use of the alkali or alkaline earth alloys prepared according to the method of the invention as bulk material, in particular as light-metal alloys. A special application of these light-metal alloys is to enhance the hardness of materials.

The alkali or alkaline earth alloys prepared according to the method of the invention may also be used as coating material, preferably as coating material containing precious metal, in particular as oxidation catalyst, reduction catalyst, reaction catalyst or as a catalyst in chemical processes for degrading or converting organic substances or gases.

The alkali or alkaline earth alloys prepared according to the method of the invention may be used, for example, to produce coatings for use on the engine interiors, pistons, exhaust-gas systems and exhaust-gas filters, especially diesel particulate filters, of internal combustion engines, on panes, machine parts, pipes or power-plant components, in particular for glass and steel inserts and for chimney stones and filter mats, as deslagging agents in power plants, as anti-stick agents on see-through oven doors and hotplates, in particular ceramic hobs, on a carrier for the removal of volatile organic compounds from indoor ambient air, especially after concentration on the coating, in fuel cells to remove gaseous impurities in the hydrogen, especially carbon monoxide, and as co-catalyst for generating energy by (photo)catalytic splitting of water into hydrogen and oxygen.

The subject of the invention may also be used in power plants or pipes in order to prevent caking at elevated temperatures. When used as coating, or as additive in coating compounds, on other substrates, such as steel or stone, the subject of the invention has applications in power-plant stacks, combustion chambers, household chimney pipes, as coatings for grills and coatings in household appliances.

The material according to the invention may also be used to influence the ignition point of petrol, diesel or kerosene in the combustion chambers of engines.

The coating material used to prepare alkali or alkaline earth alloys may furthermore be used in industry as a deodorizing catalyst.

Bonding to the substrate is effected by inorganic binders; it is also possible to add the active component in the form of additives to already-existing coating compounds (e.g. ceramic slurries, nano-suspensions, glass fits or sol-gel systems). The coating material used to prepare alkali or alkaline earth alloys may also be added to a coating system of the kind described in DE 10 2005 021 658 A1.

Through a suitable choice of binder, the inventors have succeeded in developing a non-abrasive coating. The catalytic activity of the coating is not impaired even in the case of visible abrasive damage (scratches). The catalytic combustion activity of the coating is in the range from 100 to 550° C., preferably between 250 and 400° C., and even more preferably between 250 and 350° C. The catalytic activity promotes particularly the combustion of organic substances, soot, in particular candle soot, diesel soot and model soot, and volatile combustion products of wood, natural gas, petroleum and petrol.

The ignition temperature for the combustion of soot particles is between 100 and 450° C., most preferably between 250 and 350° C. These ignition temperatures can be reached without a supply of nitrogen oxides during combustion.

The coating's oxidation power is determined by visual assessment and not by customary methods such as TGA and DTA thermal analyses. To this end, a model soot dispersion (1-5% in solvent) is applied onto the coating in such manner as to blanket it with soot. Alternatively, the coating may be blanketed with candle soot. To determine the ignition temperature for soot combustion, the coated substrate with the blanket of soot is exposed to different temperatures in an oven. After an hour at a temperature between 100 and 500° C., in particular between 250 and 350° C., the blanket of soot is either no longer present or flakes off, presumably as a result of dehesion caused by oxidation of the undermost soot layer. If the coated substrate is left in the oven for longer periods (2-5 hours), this combustion temperature is reduced significantly.

The invention is explained in detail below by reference to embodiments.

EXAMPLE 1

94.85 g (3-glycidoxypropyl)trimethoxysilane (GPTES) and 31.55 g silica sol (Levasil 200s) are stirred for one hour. After an hour's stirring, 240.13 g sodium nitrate in 741.64 g 5% acetic acid are added, the pH of the solution adjusting to a value of around pH 3. The solution is pre-cured at 120° C. to constant weight, ground and then cured in a high-temperature furnace at 850° C. in an atmosphere of protective gas. A grey-black powder is obtained.

EXAMPLE 2

5.00 g aluminium oxide C (mean primary-particle size=13 nm) are dispersed in 95.0 g of 5% acetic acid with an Ultra-Turrax disperser for 10 minutes at 15,000 rpm. A TEOS hydrolysate (prepared by stirring 27.72 g TEOS and 10 g 0.01 M hydrochloric acid until a clear solution is obtained) is stirred into the dispersion. After an hour's stirring, 17.9 g potassium formiate are added. The pH of the solution is adjusted to pH 3 with 10% acetic acid. The coating solution is applied to a metallic substrate and cured as in Example 1 by heating in an atmosphere of protective gas.

EXAMPLE 3

58.75 g calcium hydroxide are added portion-wise to 117.4 g (3-glycidoxypropyl)triethoxysilane (GPTES) and 61.7 g tetraethoxysilane in such a manner that the temperature does not exceed 50° C. Following overnight stirring, 558.7 g isopropanol are added and 40.24 g water added dropwise in portions. Following overnight stirring, the solution is ready to use for coating. The solution is applied onto glass or steel by flooding and then subjected to thermal post-curing for 1 h at 500° C. (2° C./min heating up rate). A transparent, cataytically active coating is obtained, which combusts soot at temperatures of between 250 and 400° C.

To assess the soot degradation, a dispersion of model soot is applied to the coating by flooding. Alternatively, the coating may be blanketed with candle soot. The soot dispersion is prepared by adding 1.8 g Degussa Printex U to 60 g isopropanol and dispersing it with an Ultra-Turrax for one minute at 15,000 rpm. The substrates are exposed to elevated temperatures for approx. 1 h. On glass, the soot is degraded completely at temperatures between 100 and 500° C., preferably between 250 and 430° C. On steel, the soot is degraded at temperatures between 100 and 450° C., preferably between 250 and 400° C.

EXAMPLE 4

1,028 g water and 133.6 g strontium nitrate are added to 22.4 g (3-glycidoxypropyl)triethoxysilane (GPTES) and 24.0 g silica sol (Levasil 200s). After the potassium salt has been stirred in, 40.0 g $TiO_2$ (Degussa P25) are added and dispersed with an Ultra-Turrax for 30 minutes at 15,000 rpm. The dispersion can be applied directly.

The solutions from Examples 3 and 4 are applied by flooding to a ceramic honeycomb moulding consisting of silicon carbide, aluminium titanate or cordierite and heat-cured for one hour at 500° C. (2° C./min heating-up rate). Pre-curing may be effected at lower temperatures.

EXAMPLE 5

8.17 g 10% acetic acid are added to 17.02 g tetraethoxysilane (Dynasilan A) and stirred for approx. one hour until a clear solution is obtained. 33.07 g potassium nitrate (purum, from Fluka) in de-ionised water are stirred into this solution. The solution is ready to use for dip-coating ceramic substrates. For the coating of steel, stainless steel or glass, 0.2 g of a flow improver may be added to improve wetting.

FIG. 1 shows photoelectron spectroscopy of a catalytically active coating.

The presence of novel alkali-silicon compositions can be detected by means of X-ray photoelectron spectroscopy (XPS). FIG. 1 shows the results of measurements performed on a coating containing silicon and potassium as components. It shows that a metallic potassium-silicon alloy, which is responsible for the catalytic oxidation of soot, forms only at the outermost atomic position (curves b). Here, both at the Si 2p and at the K 2p signal, identifiable structures (curves 1) with reduced binding energy form that are assignable both to metallic silicon and to metallic potassium. It may be assumed here that reversible alloy formation is involved. After a plurality of soot-combustion cycles (application of soot followed by low-temperature thermal combustion at 300° C., curves 2: 1×, curves 3: 3×, curves 4: 10×), the signals for the alloy disappear slowly. They reform again following thermal regeneration at 500° C. (curves 5). This effect is not identifiable at deeper atomic positions (curves a).

The invention claimed is:

1. Method for producing and regenerating a metallic alkali alloy, wherein salts, hydroxides, alkoxides or oxides of alkali metals selected from the group consisting of alkali, nitrates, carbonates, formiates, oxalates, and acetates are mixed with oxides of semi-metals, non-metals or metals, selected from the group consisting of $CO_2$, CO, silicon oxide, aluminium oxide, zirconium oxide and cerium oxide to form a mixture and the mixture is subsequently heated to at least 400° C. such that the metallic alkali alloy is formed, the salts, hydroxides, alkoxides or oxides of alkali metals being present in a molar ratio of 1:1 or in excess thereof in relation to the oxides of the semi-metals, non-metals or metals, wherein the metallic alkali alloy is subjected to a plurality of soot-combustion cycles by application of soot followed by thermal combustion of the soot at 300° C. which causes the amount of metallic alkali alloy in the mixture to diminish, and wherein the diminished alkali alloy mixture is heated to 500° C. such that the metallic alkali alloy is regenerated.

2. Method according to claim 1, wherein the salts, hydroxides, alkoxides or oxides of alkali metals are mixed with the oxides of semi-metals, non-metals or metals as liquid coating material in water.

3. Method according to claim 1, wherein the heating of the mixture is effected up to the melting temperature of the component with the highest melting point.

4. Method according to claim 1, wherein the heating of the mixture is effected for at least one minute.

5. Method according to claim 1, wherein the heating of the mixture takes place in an oxygen-free atmosphere.

6. Method according to claim 1, wherein the metallic alkali alloy is produced as a liquid coating material.

7. Method according to claim 1, wherein the salts of the alkali metals are applied to a solid ceramic body consisting of oxides of semi-metals, non-metals or metals and subjected to heat treatment at temperatures above 400° C.

8. Method according to claim 1, wherein the heating of the mixture is effected for at least one hour.

9. Method according to claim 1, wherein the heating of the mixture is effected for at least 24 hours.

* * * * *